(12) United States Patent
Ritter et al.

(10) Patent No.: US 7,576,543 B2
(45) Date of Patent: Aug. 18, 2009

(54) APPARATUS AND METHOD FOR RESISTIVITY MEASUREMENTS DURING ROTATIONAL DRILLING

(75) Inventors: Rene N. Ritter, Celle (DE); Matthias Gorek, Hannover (DE); Volker Krueger, Celle (DE); Martin Townley Evans, Norwich (GB)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/748,846

(22) Filed: May 15, 2007

(65) Prior Publication Data
US 2007/0216417 A1   Sep. 20, 2007

Related U.S. Application Data

(60) Division of application No. 10/657,870, filed on Sep. 9, 2003, now Pat. No. 7,250,768, which is a continuation-in-part of application No. 09/836,980, filed on Apr. 18, 2001, now Pat. No. 6,714,014.

(51) Int. Cl.
*G01V 3/20* (2006.01)
(52) U.S. Cl. ............. 324/369; 702/7; 73/152.43; 324/338
(58) Field of Classification Search . 73/152.43–152.46; 702/6, 7, 9, 11; 324/338–339, 366–375, 324/355–356, 340–343
See application file for complete search history.

(56) References Cited

U.S. PATENT DOCUMENTS

| | | | | |
|---|---|---|---|---|
| 2,930,969 A | 3/1960 | Baker | | 324/10 |
| 3,365,658 A | 1/1968 | Birdwell | | 324/10 |
| 4,122,387 A | 10/1978 | Ajam et al. | | 324/10 |
| 4,468,623 A | 8/1984 | Gianzero et al. | | 324/367 |
| 5,502,686 A | 3/1996 | Dory et al. | | 367/34 |
| 6,173,793 B1 | 1/2001 | Thompson et al. | | 175/45 |
| 6,179,066 B1 * | 1/2001 | Nasr et al. | | 175/45 |
| 6,205,851 B1 | 3/2001 | Jogi | | |
| 6,359,438 B1 * | 3/2002 | Bittar | | 324/369 |
| 6,396,276 B1 * | 5/2002 | Van Steenwyk et al. | | 324/366 |
| 6,443,228 B1 * | 9/2002 | Aronstam et al. | | 166/250.11 |
| 6,478,097 B2 * | 11/2002 | Bloom et al. | | 175/51 |

(Continued)

FOREIGN PATENT DOCUMENTS

CA         685727         5/1960

*Primary Examiner*—Bot LeDynh
(74) *Attorney, Agent, or Firm*—Madan & Sriram, P.C.

(57) ABSTRACT

A resistivity sub including a resistivity sensor forms part of a bottom hole drilling assembly. The sensor is maintained at a substantially fixed offset from the wall of a borehole during drilling operations by, for example, a stabilizer. In WBM, galvanic sensors may be used, with or without commonly used focusing methods, for obtaining a resistivity image of the borehole wall. In OBM, capacitive coupling may be used. The apparatus is capable of using other types of sensors, such as induction, MPR, shielded dipole, quadrupole, and GPR sensors. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims. 37 CFR 1.72(b).

22 Claims, 14 Drawing Sheets
(1 of 14 Drawing Sheet(s) Filed in Color)

U.S. PATENT DOCUMENTS

| | | |
|---|---|---|
| 6,584,837 B2 | 7/2003 | Kurkoski |
| 6,600,321 B2 | 7/2003 | Evans ........................ 324/369 |
| 7,250,768 B2 * | 7/2007 | Ritter et al. ................. 324/369 |
| 2001/0042643 A1 * | 11/2001 | Krueger et al. ................ 175/73 |
| 2003/0070844 A1 | 4/2003 | Radzinski et al. ............. 175/61 |
| 2003/0076106 A1 | 4/2003 | Mercer ........................ 324/326 |
| 2004/0008030 A1 | 1/2004 | Mercer et al. ................ 324/326 |
| 2004/0089474 A1 | 5/2004 | Noureldin et al. ............. 175/45 |
| 2004/0222019 A1 | 11/2004 | Estes et al. .................... 175/45 |
| 2005/0056461 A1 | 3/2005 | Estes et al. .................... 175/45 |
| 2005/0150689 A1 | 7/2005 | Jogi et al. ..................... 175/45 |
| 2005/0224257 A1 | 10/2005 | Ekseth et al. ................. 175/45 |
| 2005/0236185 A1 | 10/2005 | Mercer et al. ................. 175/45 |
| 2006/0048970 A1 | 3/2006 | Chau et al. .................... 175/26 |
| 2007/0216417 A1 | 9/2007 | Ritter et al. ................. 324/367 |
| 2007/0235226 A1 | 10/2007 | Wright et al. ................. 175/45 |

\* cited by examiner

QUADRUPOLE INDUCTION SYSTEM

APPARATUS AND METHOD FOR RESISTIVITY MEASUREMENTS DURING ROTATIONAL DRILLING

CROSS REFERENCES TO RELATED APPLICATIONS

This application is a divisional application of U.S. patent application Ser. No. 10/657,870 filed on 9 Sep. 2003, now U.S. Pat. No. 7,250,768 B2, which is a continuation-in-part of U.S. patent application Ser. No. 09/836,980 filed on 18 Apr. 2001, now U.S. Pat. No. 6,714,014.

BACKGROUND OF THE INVENTION

1. Field of the Invention

The present invention relates to well logging. In particular, the present invention is an apparatus and method for imaging of subsurface formations using electrical methods.

2. Background of the Art

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems Techniques for investigating the earth formation with arrays of measuring electrodes have been proposed. See, for example, the U.S. Pat. No. 2,930,969 to Baker, Canadian Pat. No. 685,727 to Mann et al. U.S. Pat. No. 4,468,623 to Gianzero, and U.S. Pat. No. 5,502,686 to Dory et al. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies The Dory patent discloses the use of an acoustic sensor in combination with pad mounted electrodes, the use of the acoustic sensors making it possible to fill in the gaps in the image obtained by using pad mounted electrodes due to the fact that in large diameter boreholes, the pads will necessarily not provide a complete coverage of the borehole.

Co-pending U.S. patent application Ser. No. 09/836,980 of Evans et al ("the Evans '980 application"), the contents of which are fully incorporated herein by reference, discloses a device suitable for resistivity imaging with water based mud (WBM) and oil based mud (OBM). The device disclosed in the Evans '980 application is basically a wireline logging device. U.S. Pat. No. 6,600,321 to Evans discloses a modification of the Evans '374 application that is adapted for use in measurement while drilling (MWD) applications. Both of the Evans' applications have pad mounted electrodes that are in contact with the earth formation.

Another device that could be used for MWD resistivity measurements is the one described in U.S. Pat. No 6,173,793 to Thompson et al. In Thompson, the drill bit may be driven by a downhole drilling motor. The motor may be on a rotating drillstring or on coiled tubing. The sensors for measuring the parameters of interest could be rotating with the drill bit. Alternatively, the sensors could have one of several configurations. In one configuration, the sensors are mounted on a substantially non-rotating sleeve; in another configuration, the sensors are mounted on pads that could be rotating or non-rotating, the pads being hydraulically or mechanically actuated to make contact with the borehole wall; in yet another configuration, the sensors are mounted on substantially non-rotating rib-steering devices used to control the direction of the downhole drilling tool. In any of these arrangements, the downhole assembly is provided with sensors that make measurements of the parameters of interest. The assembly is provided with magnetic and inertial sensors to provide information on the orientation of the measurement sensors. A telemetry system sends information downhole about the depth of the drilling assembly. A microprocessor downhole combines the depth and azimuth information with the measurements made by the rotating sensors, uses redundancy in the data to improve S/N ratio, compresses the data and sends it uphole by a telemetry system.

The devices of Evans and of Thompson when used for resistivity imaging suffer from one significant drawback. Being contact devices, there is considerable wear on the sensors. The Evans devices comprise a plurality of sensing electrodes and are relatively bulky. The Thompson device is best suited for use with a slowly rotating sleeve. With a slowly rotating sleeve, it may not be possible to get a full 360° image of the borehole.

It would be desirable to have a resistivity imaging apparatus and method for providing MWD images of earth formations. Such a device should preferably be operable with OBM and WBM. It is also preferable that the device should be relatively simple and not be subject to undue wear and tear in MWD operations. The present invention satisfies this need.

SUMMARY OF THE INVENTION

The present invention is an apparatus and method of obtaining a resistivity image of a borehole during drilling operations. A resistivity sensor is maintained at a specified standoff from the borehole wall using a suitable device. A processor uses measurements from an orientation sensor on the resistivity sub for determining a toolface orientation during continued rotation. The resistivity sensor may be mounted on a pad, rib, or a stabilizer. The resistivity sensor may be galvanic and may include suitable focusing, guard and monitor electrodes. A variety of focusing techniques may be used. A processor, preferably downhole, may be used for maintaining a substantially constant power consumption. The orientation sensors may be a magnetometer, an accelerometer, or a gyroscope. In oil based mud, capacitive coupling may be used. Multifrequency measurements may be used in combination with known frequency focusing techniques.

Non-galvanic sensors may also be used for making resistivity measurements. These include induction sensors, and may further include a shielded dipole or a quadrupole antenna for directionality. A ground penetrating radar may be used for monitoring fluid invasion into the earth formation.

BRIEF DESCRIPTION OF THE FIGURES

The file of this patent contains at least one drawing executed in color: Copies of this patent with color drawing(s) will be provided by the Patent and Trademark Office upon request and payment of the necessary fee.

The novel features that are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE INVENTION

Figure 1:
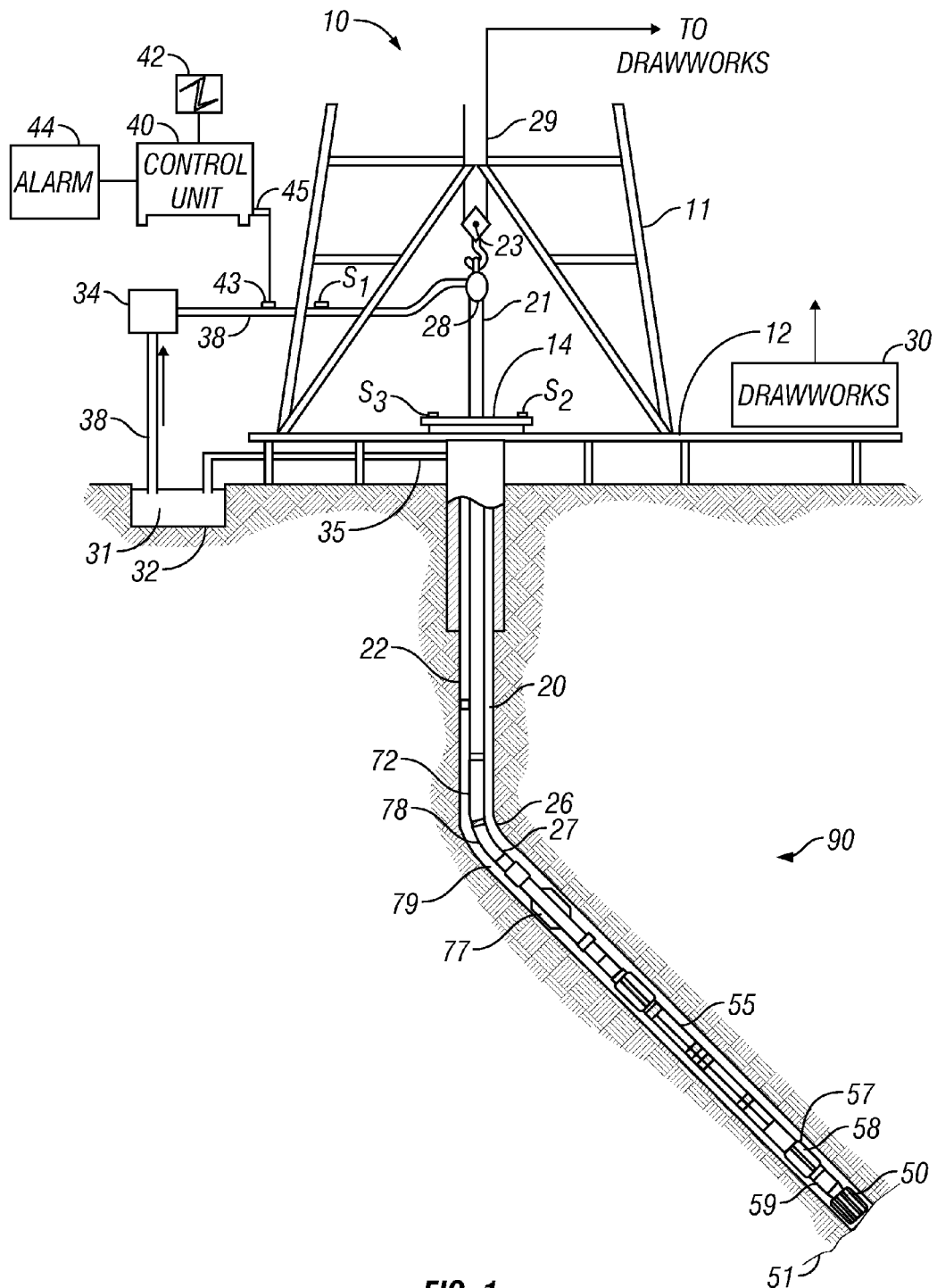
FIG. 1 (prior art) is a schematic illustration of a drilling system.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel, 28 and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger 36, fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drill string. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the preferred embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

Figure 2:
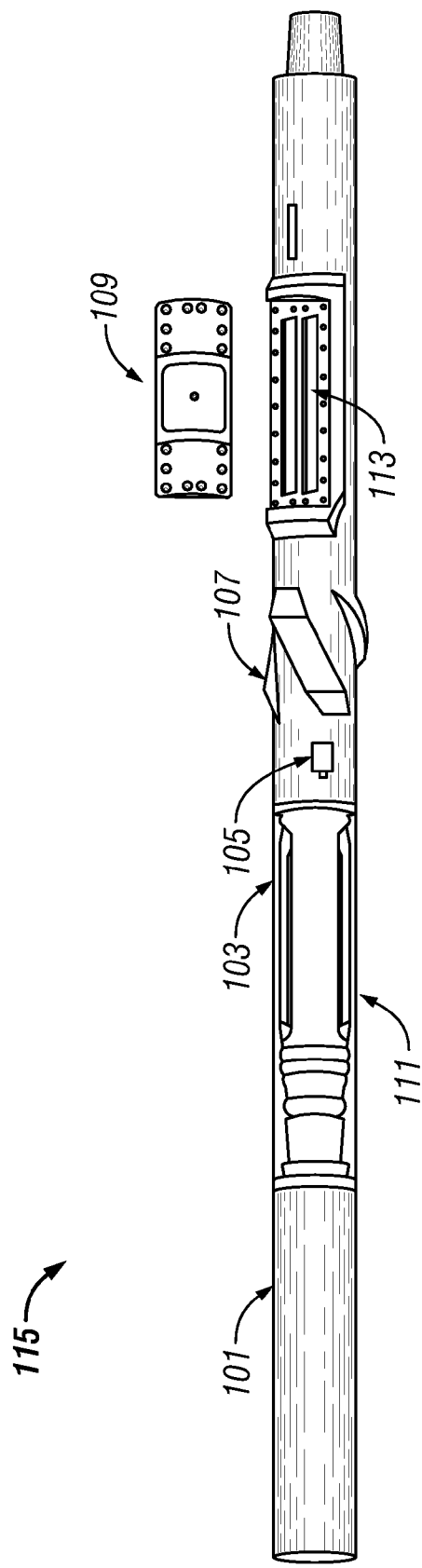
FIG. 2 is an exemplary configuration of the various components of a resistivity measuring sensor sub.

Turning now to FIG. 2, an exemplary configuration of the various components of the resistivity measuring sensor sub are shown. At the upper end, a modular cross-over sub 101 is provided. The power and processing electronics are indicated by 103. The sub is provided with a stabilizer 107 and a data dump port may be provided at 105. A resistivity sensor (discussed further below) are provided at 109 with the sensor and measuring electronics at 113. Modular connections 115 are provided at both ends of the sub that enable the sub to be part of the bottom hole drilling assembly. An orientation sensor 111 is provided for measuring the toolface angle of the sensor assembly during continued rotation. Different types of orientation sensors may be used, including magnetometers, accelerometers, or gyroscopes. Use of such devices for determination of the toolface angle are known in the art and are not discussed further herein.

The stabilizer shown at 107 serves several important functions. Like conventional stabilizers, one function is to reduce oscillations and vibrations of the sensor assembly. However, in the context of the present invention, it also serves another important function, viz, centralizing the portion of the bottom hole assembly (BHA) including a sensor assembly, and also maintaining the sensors with a specified standoff from the borehole wall. This is not visible in FIG. 2, but the outer diameter of the stabilizer is greater than the outer diameter of the portion of the BHA including the resistivity sensor. As a result of this difference in diameter, the resistivity sensor is maintained with a standoff from the borehole wall during continued rotation of the drillstring, hence avoiding the problems with wear associated with the prior art devices such as Thompson, and Evans.

Figure 3A:
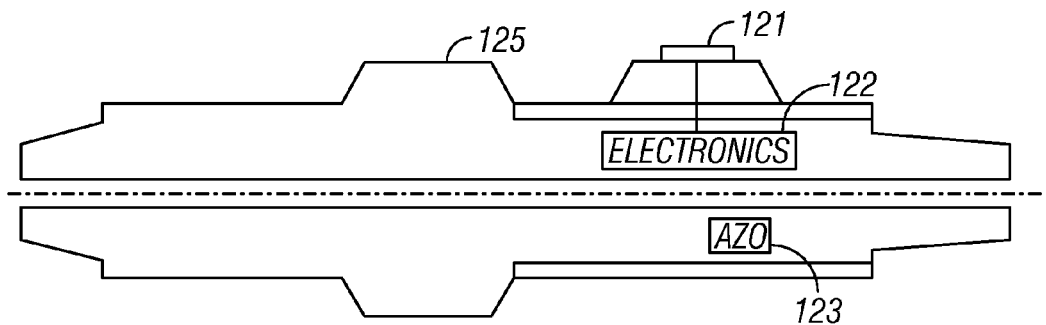
FIGS. 3A-3D show exemplary configurations of a resistivity measuring sub.
Figure 3B:
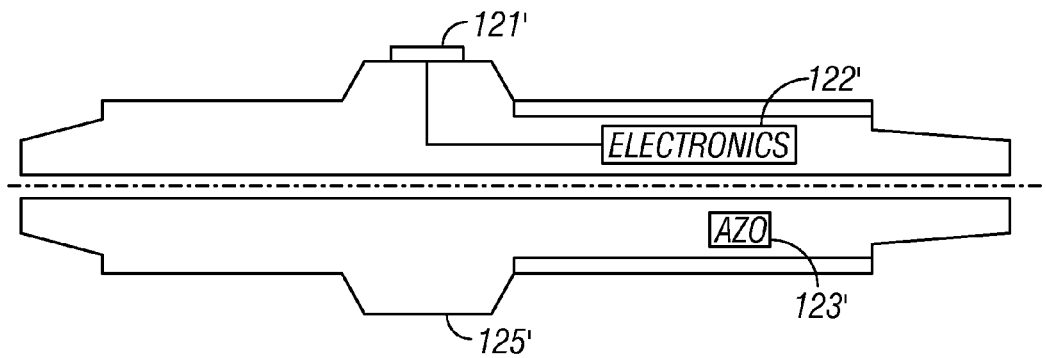
Figure 3C:
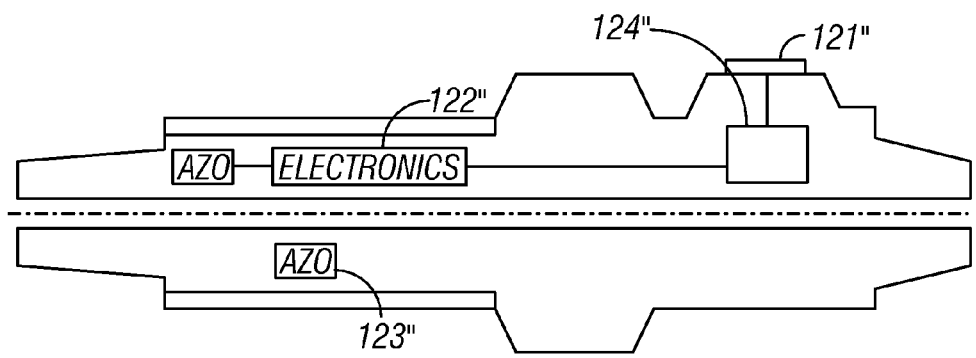
Figure 3D:
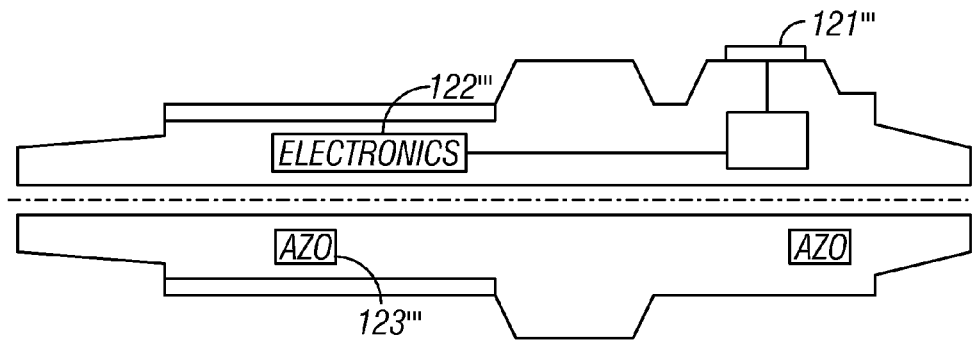

Turning now to FIG. 3A, an exemplary configuration of the various components is shown. A stabilizer is shown at 125, the resistivity sensor is generally depicted at 121 and the associated electronics are shown generally at 122. As shown in FIG. 3A, the resistivity sensor could be any one of the types described further below. The orientation sensor is depicted at 123. In FIG. 3B, the arrangement is similar to that of FIG. 3A with the difference that the resistivity sensor 123' may be deployed on the stabilizer. The configuration in FIG. 3C depicts an additional portion of the resistivity sensor by 124". This is meant to generally depict a somewhat more complicated resistivity sensor: for example, as shown in FIG. 3C, the portion 121 could be a current electrode and the portion 124" could depict electronics associated with a guard electrode. FIG. 3D shows another possible arrangement of the components shown in FIG. 3C. The point to be made here is that a wide variety of types of resistivity sensors may be used, and the disposition of the resistivity sensors, associated electronics, and orientation sensors could be quite varied. When the resistivity sensor is deployed on a stabilizer, it is recessed so as to avoid contact between the sensor and the borehole wall.

There are a number of different configurations by which the sensor assembly may be coupled to the drill collar. In one embodiment of the invention, the sensor is installed at a fixed position on the drill-collar, so that it rotate with exactly the same rotational speed as the drillstring does. One possible drawback of such an arrangement is the vast amount of data that would result. The rate of penetration of a bottom hole assembly is relatively slow, so that with a typical rotational speed of 60 rpm, the data that are acquired have a high amount of redundancy. In some situations where the signal to noise ratio (SNR) is low, the redundancy can be advantageous and the data can be stacked to improve the SNR. However, in many instances, this may not be necessary. At the other extreme is the arrangement described in Thompson et al. where the sensors are mounted on a substantially non-rotating sleeve. The possible drawback of such an arrangement is that if the rotation rate of the sleeve is too slow, the borehole wall may be inadequately sampled by a single resistivity sensor. As taught in Thomson et al, a plurality of sensors, possibly on a plurality of pads, may be used: this leads to a more complicated system. Accordingly, in a preferred embodiment of the present invention, the sensor is mounted on a sleeve which rotates by a separate drive. In this case, the movement of the electrodes is uncoupled from the rotation of the drillstring. This makes it possible to control the azimuthal sampling of the borehole wall as well as the amount of redundancy in the data. In any case, the distance of the electrode surface to the formation is maintained by a near by stabilizer. In an optional embodiment of the invention, steerable ribs which are used to keep the exact distance. The separate drive may include a stabilizer. In addition and for further failure correction, the stand off will be monitored by means of acoustic calipers.

Figure 4:
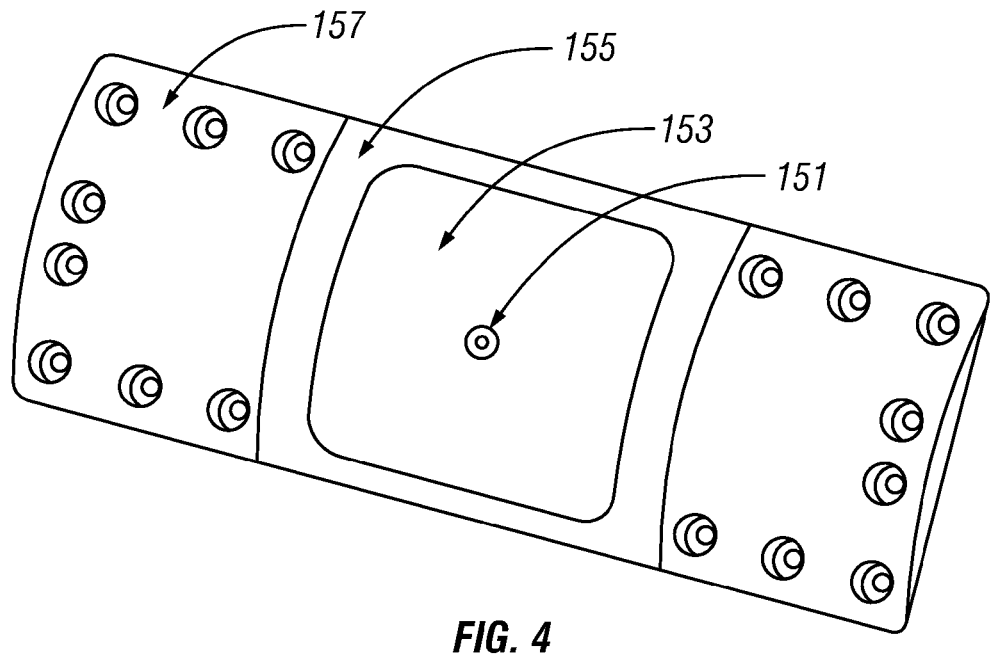
FIG. 4 shows an exemplary illustration of a galvanic sensor.
Figure 5:
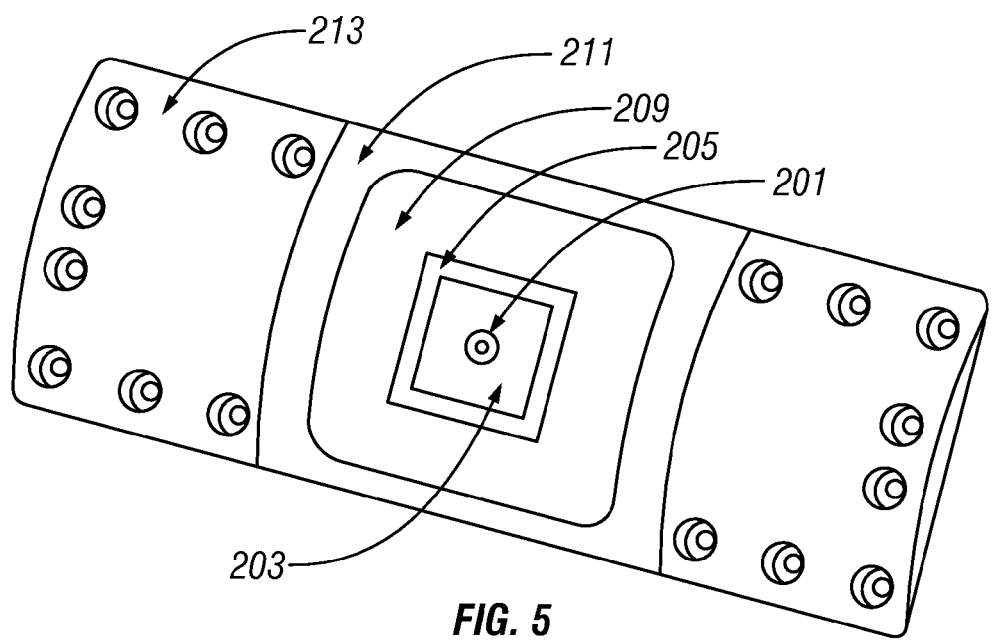
FIG. 5 shows another exemplary illustration of a galvanic sensor.

Turning now to FIG. 4, one configuration of the resistivity sensor is shown. This particular resistivity sensor is a galvanic sensor that operates by conveying a measure current into the formation. The measure electrode is indicated by 151, the guard electrode is denoted by 153, an insulating section by 155 and the return path for the electrical current from the measure electrode is through the body shown by 157. In an alternate embodiment of the invention, shown in FIG. 5, the measure electrode is denoted by 201, a first guard electrode by 203, an insulating section by 205, a second guard electrode by 209, a second insulating section by 211. For shallow depth of investigation, 203 can be the guard and 209 is the return electrode. For deeper investigation, 203 and 209 are maintained at the same potential and the return path for the electrical current is through the body 213 Those versed in the art would recognize that with the configurations shown in FIGS. 3 and 4, any of the commonly used galvanic sensory arrangements can be implemented, as discussed below.

One possible arrangement is of the commonly used device known as the laterolog Current is sent between different guard electrodes to achieve different depths of investigation into the formation. In the configuration referred to as a microlaterolog, guard electrode surrounds said measure electrode and maintains a focusing of said measure current in a flushed zone of said formation. The electrodes may be configured to create substantially spherical equipotential surfaces. This is referred to as spherical focusing. In the "short normal" configuration, a current electrode conveys a measure current into said formation, and voltage is measured at a measure electrode spaced apart from said current electrode From the voltage of the measure electrode and the measure current, an indication of a resistivity of said earth formation is obtained. In a particular embodiment of the present invention, the guard electrode may extend the full circumference of the tool. All of these are known in the art and are not discussed further.

Figure 6:
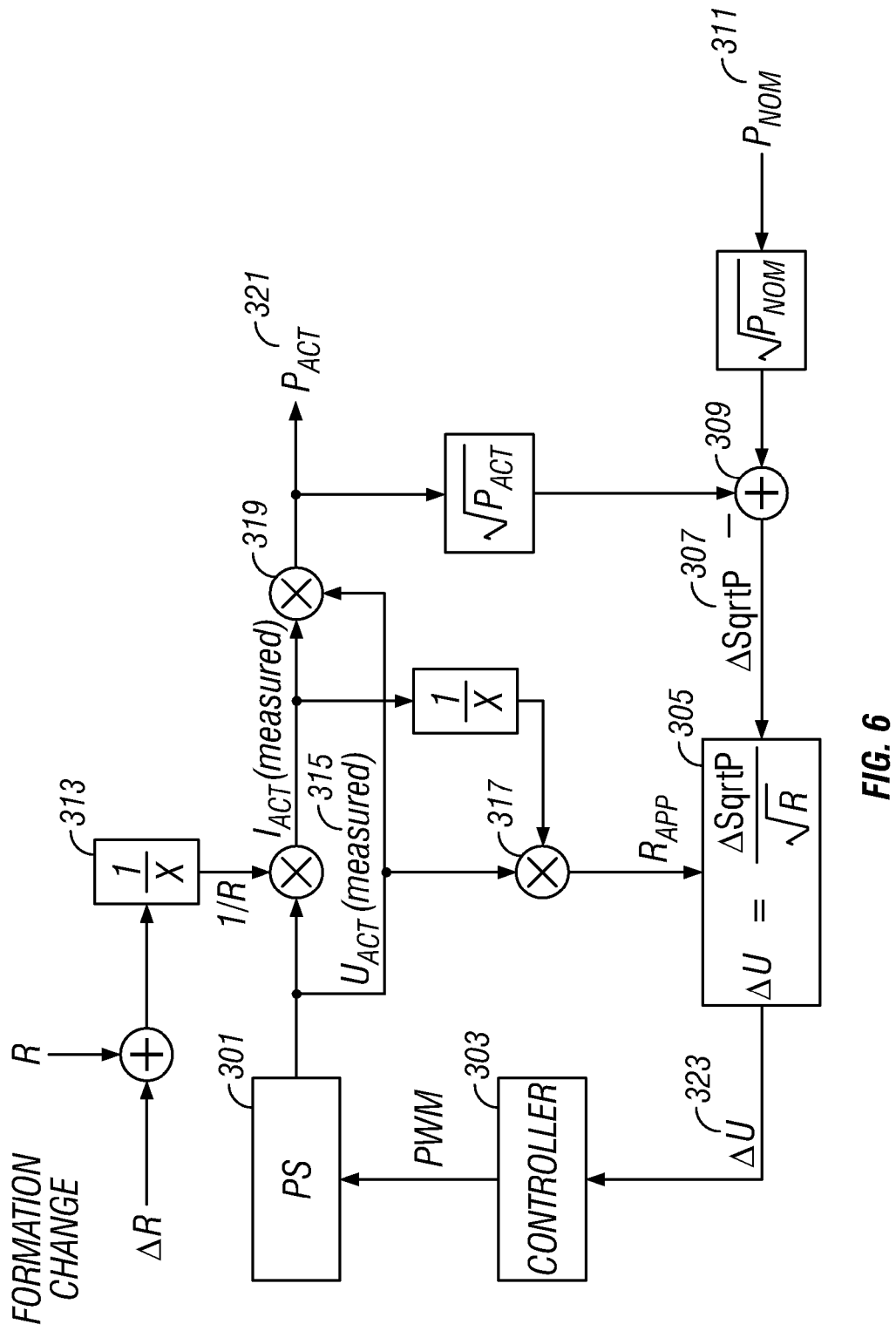
FIG. 6 is an exemplary block diagram of an arrangement for maintaining constant power consumption.

The present invention provides a control of the voltage and/or the current at guard and measurement electrodes. There are several methods of doing this. For achieving an optimal focusing guard and measurement electrode need to be kept on almost the same potential. An improvement of the SNR for the measurement in very high resistive formations could be provided by increasing the voltage on the measurement electrode. Due to the coupling of potential between measurement and guard electrode the guard current would increase dramatically by keeping such a high voltage in low resistive formations. To overcome this problem voltage and/or current of the guard and/or measurement electrode can be controlled, for instance by keeping the power constant. This is shown in FIG. 6. The power supply 301 is controlled by the controller 303 in response to a signal ΔU 323. This signal ΔU is obtained as a ratio of a power difference ΔSqrtP 307 and an apparent resistance Rapp. The power difference ΔSqrtP is obtained as a difference between square roots of a nominal power $P_{nom}$ 311 and an actual power consumed $P_{act}$ 321., the difference being determined at 309. The apparent resistance $R_{app}$ is obtained from the product 317 of the electrode potential $U_{act}$ 315 and the reciprocal of the measure current $I_{act}$. (The product 319 of $U_{act}$ 315 and the measure current $I_{act}$ gives the actual power $P_{act}$ 321). If the tool enters a formation with a different resistivity 313, the current through the formation and therefore the electrical power will change. The voltage will be controlled so that the electrical power will stay constant. Other controlling methods, for instance controlling by keeping current or voltage constant, are also possible.

Figure 7:
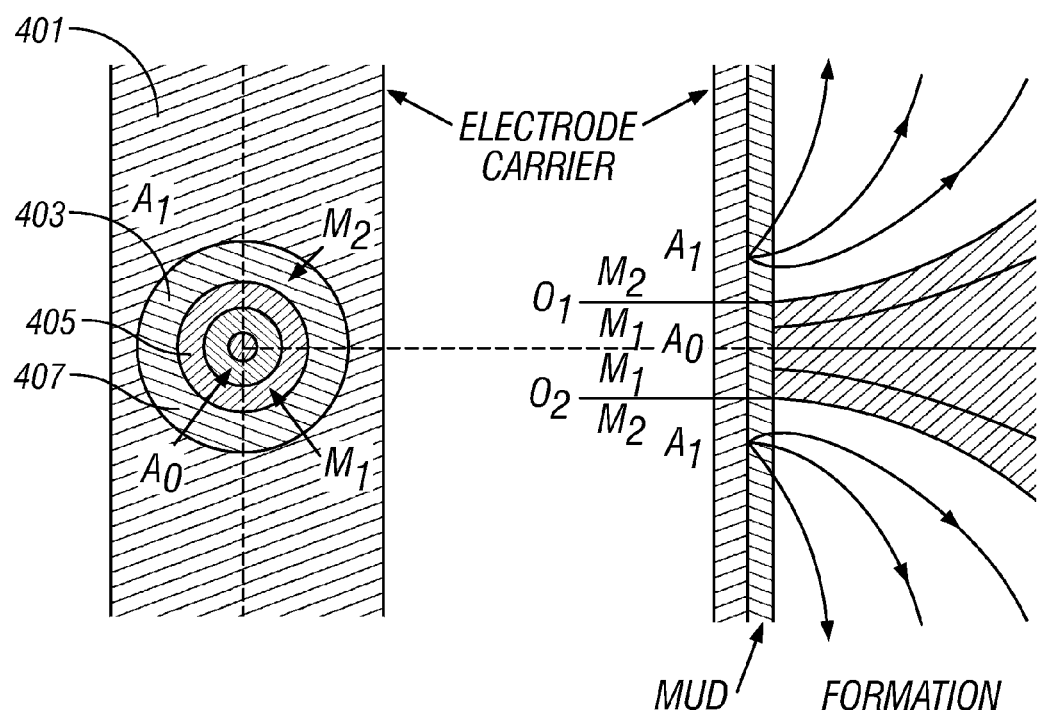
FIG. 7 (prior art) shows an electrode configuration according to one embodiment of the present invention.
Figure 8:
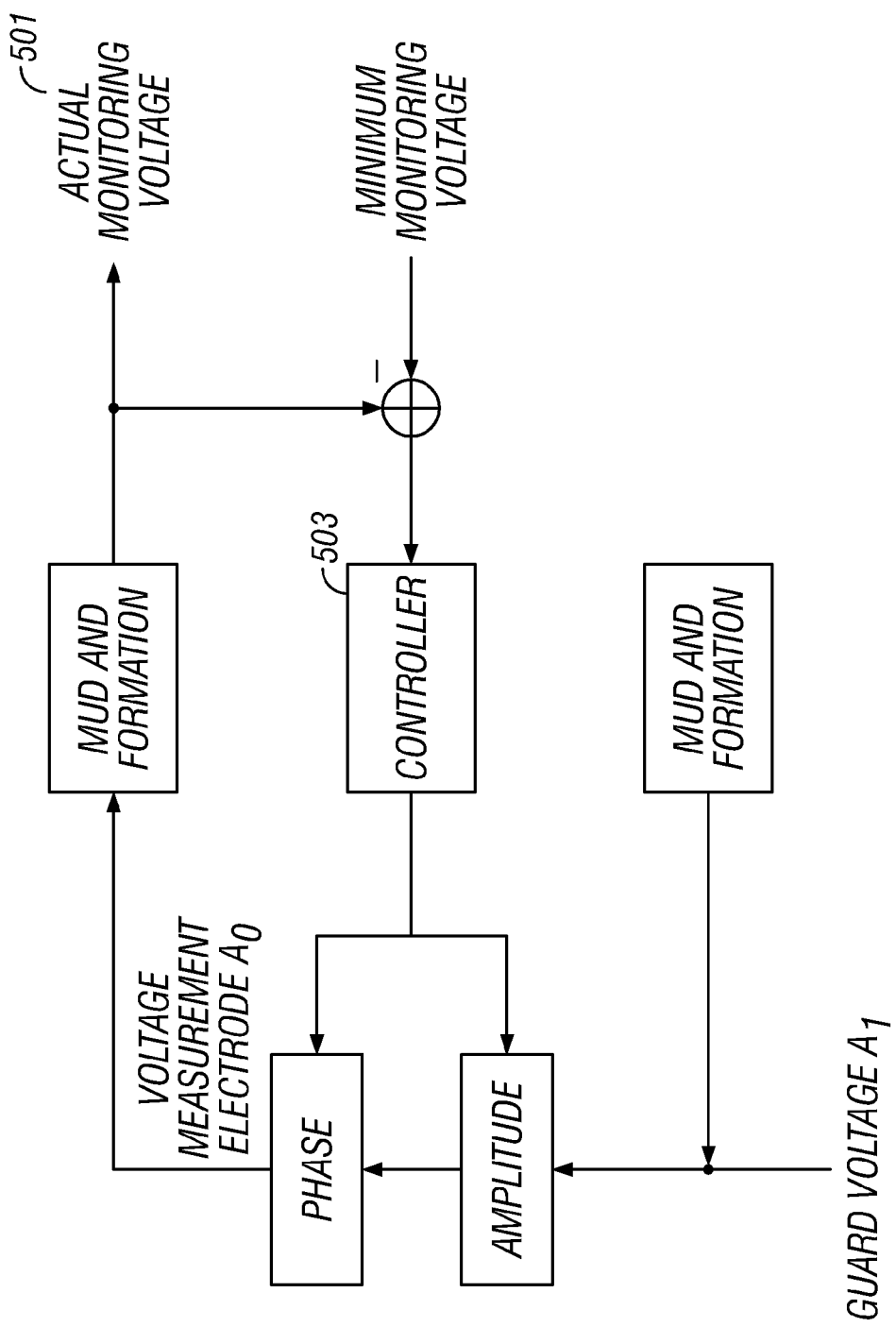
FIG. 8 is a block diagram of an arrangement for compensating for contact resistance.

One of the potential problems that have to be considered is the effect of contact impedances. Compensating for these effects is discussed next with reference to FIGS. 7 and 8. Shown in FIG. 7 is a focused arrangement with the current electrode denoted by 405 and the guard electrode denoted by 401. In the example, two concentric monitor electrodes are shown by 403 and 407. The right hand portion of FIG. 7 shows current flows into the formation. If 401 and 405 have the same electrical potential, then existence of a voltage difference between the monitor electrodes 403 and 407 is an indication of significant contact impedance. FIG. 8 illustrates a controlling diagram for keeping the monitoring voltage 501 at a minimum (zero) 502 by varying for instance the voltage on the measurement electrode 503. The voltage on the guard electrode 504 could be already adjusted for instance by means of a power control and assumed as constant. The controller 505 will amplify (attenuate) and/or phase shift the signal of the guard electrode in order to generate the voltage on the measurement electrode 503, depending on the difference between monitoring electrode voltage 501 and minimum monitoring voltage 502 This technique has been used for a longer time now in wireline applications (Serra, 1984).

Figure 9:
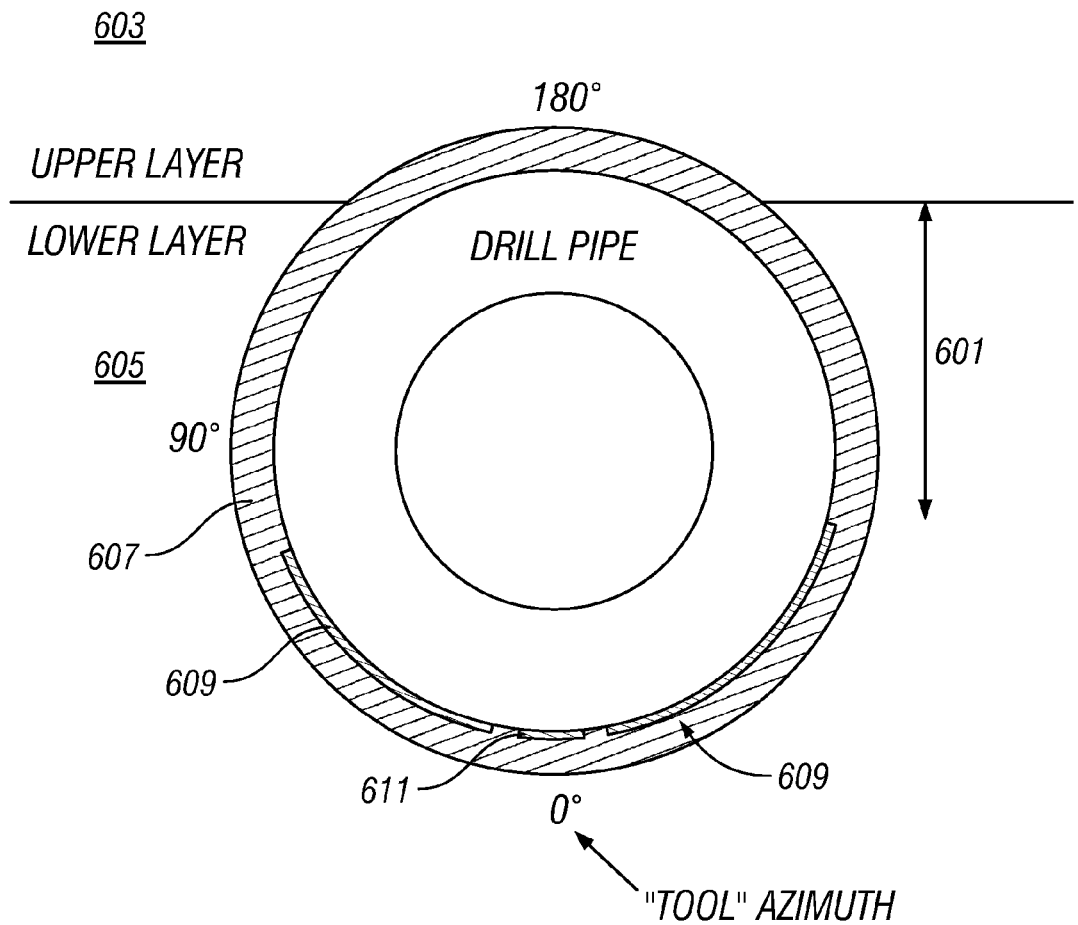
FIG. 9 is an illustration of a model showing a resistivity measuring device according to the present invention in proximity to a bed boundary.
Figure 10:
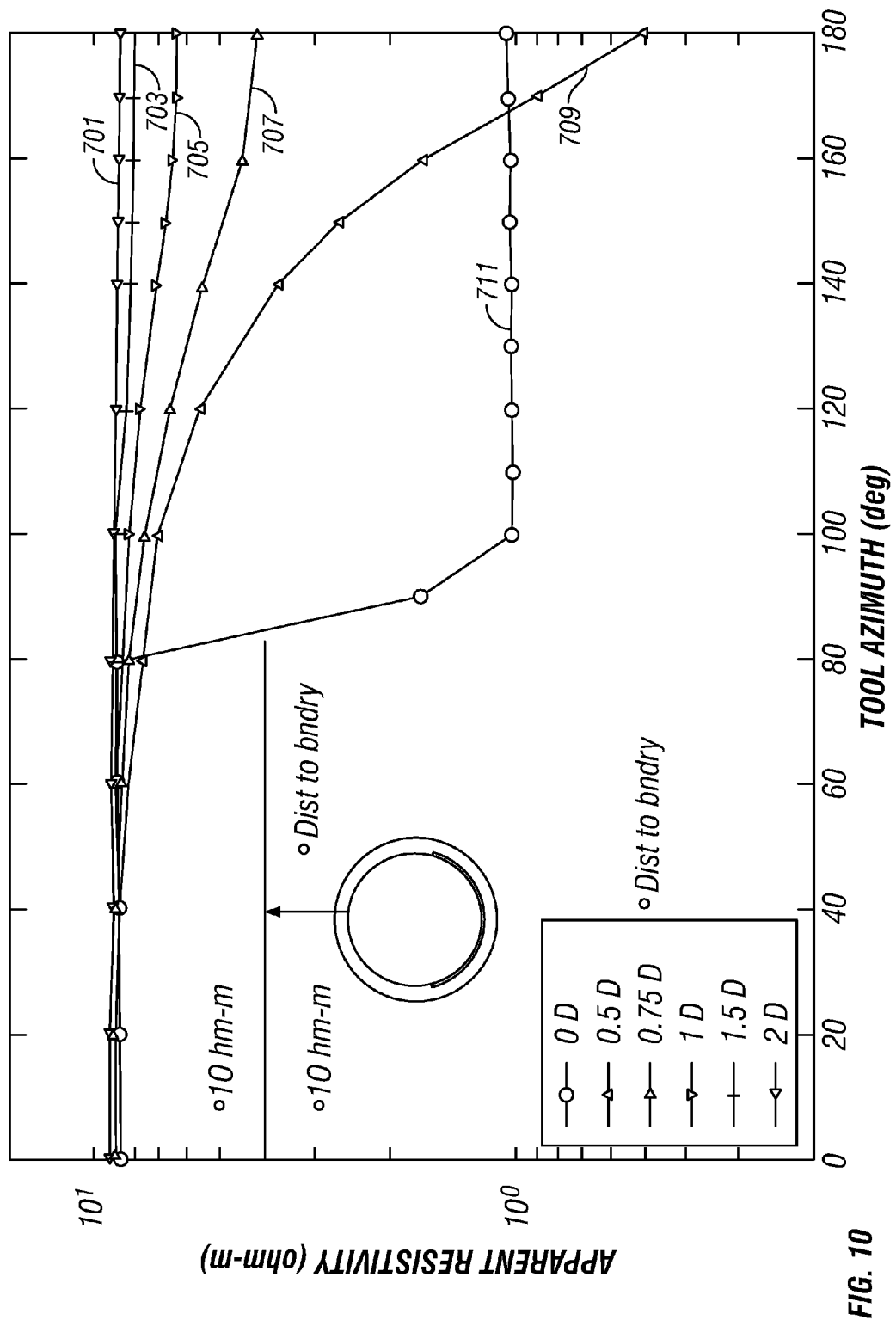
FIG. 10 shows simulated azimuthal responses for the configuration of FIG. 9 for various distances of the tool from the bed boundary.

The ability of a simple electrode system of FIG. 4 to measure azimuthal variations of resistivity is illustrated next in FIGS. 9 and 10. Shown in FIG. 9 is a cross section of the tool in proximity to a bed boundary. The outer diameter of the drill pipe 607 is defined as "D". The measure electrode is shown as 611 and the guard electrode by 609. The resistivity of the upper layer 603 is 1 Ω m while the resistivity of the lower layer 605 is 100 Ω m. 0° azimuth (or toolface angle) is defined to be the tool orientation for which the measure electrode is away from the boundary while 180° azimuth is for the measure electrode towards the boundary. FIG. 10 shows the variation of the measured resistivity (ordinate) as a function of azimuth (abscissa). The curve 701 corresponds to the case where the distance from the center of the drillpipe to the boundary is 2D. Curves 703, 705, 707, 709 and 711 show azimuthal variations for distances of 1.5D, 1D, 0.75D, 0.5D and 0D respectively. Based on FIG. 10, it is thus possible to get an indication of close proximity to a bed boundary from azimuthal variations of apparent resistivity as measured by a galvanic resistivity sensor.

Figure 11:
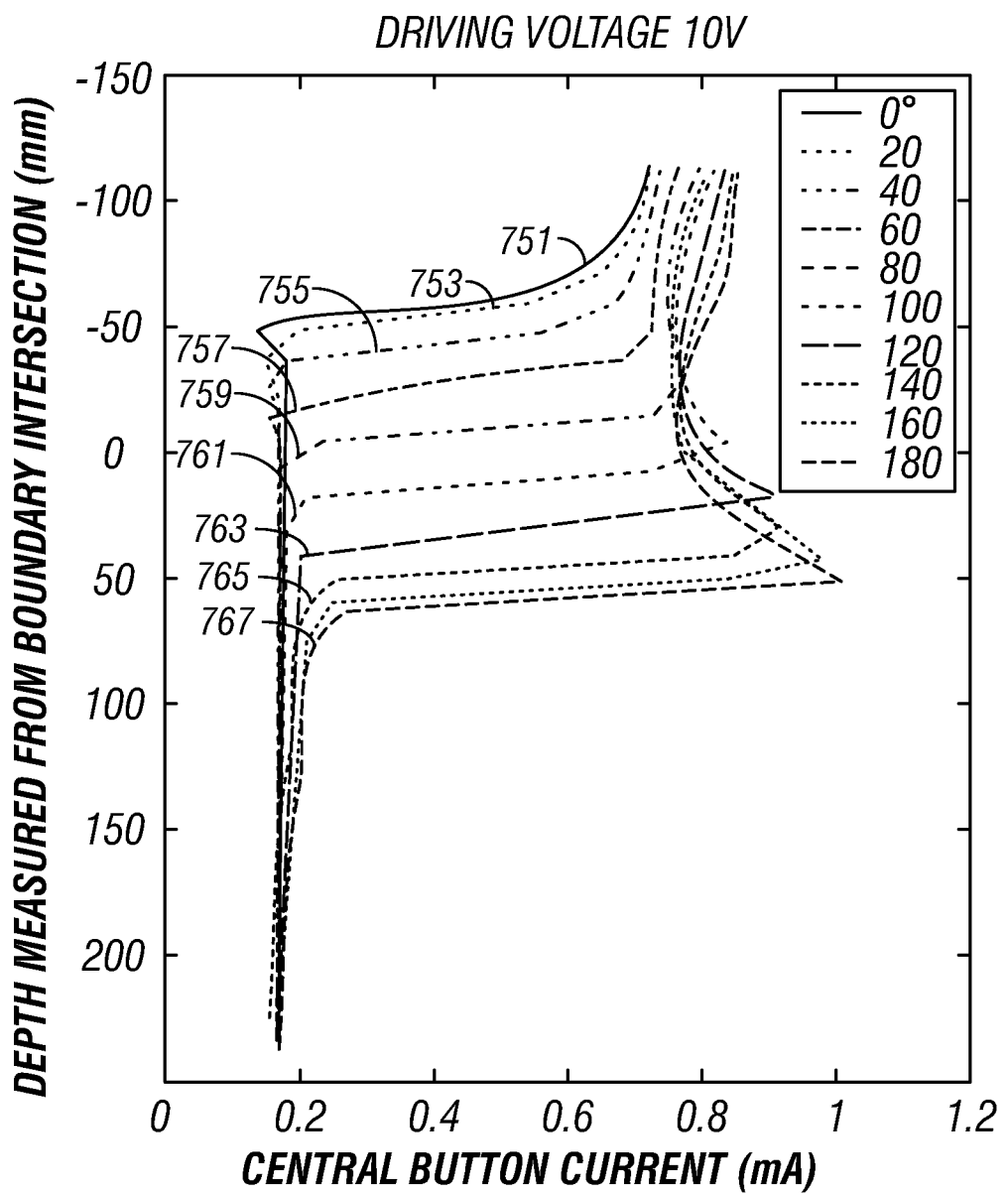
FIG. 11 shows model measurements using the device of the present invention in proximity to a model.

Another indication of the resolution of such a tool can be obtained from FIG. 11. The ordinate is the depth of the tool from the bed boundary. The abscissa is the current in the current electrode. The curve 751 shows the variation of the current for an azimuth of 0°. The current has a low value of approximately 0.2 mA when the tool is below the boundary in the high resistivity medium (10 Ω m). This low current persists as the tool is moved up until, when the tool is 50 mm above the bed boundary, the current increases to about 0.8 mA in the low resistivity medium (1 Ω m). For a sensor at 180° azimuth (given by 769), the current starts changing value from the low to high when the center of the tool is 50 mm below the bed boundary. The other curves 753, 755, 757, 759, 761, 763, 765, 767 correspond to azimuths of 20° to 160° in 20° increments.

The apparatus and methods described above are suitable for use with water based mud (WBM) where the fluid in the borehole is conductive. With relatively minor modifications, the apparatus and methods can also be used in oil based mud (OBM). As discussed in the Evans '980 application and in Evans et al, galvanic measurements of earth formations can be made through an OBM by using capacitive coupling. As noted above, one important in which the present invention differs from the teachings of the Evans '980 application or the Evans et al patent is that the present invention is not a contact device. However, the principles of capacitive coupling as taught in either of the Evans documents can be used in the present invention. By operating at a sufficiently high frequency, the source current can be capacitively coupled into the formation. This is true for all of the embodiments discussed above.

The apparatus of the present invention can also be used to operate at a plurality of frequencies, and measurements made at a plurality of frequencies can be used to determine formation resistivities. This is taught in U.S. patent application Ser. No. 10/347,019 of Tabarovsky et al, having the same assignee as the present application and the contents of which are fully incorporated herein by reference. The frequency is selected to make an impedance caused by the dielectric constant of the non-conducting fluid to be substantially less than a resistivity of said nonconductive fluid. In one embodiment of Tabarovsky, a dual frequency method is used for determining formation resistivity. In another embodiment taught by Tabarovsky, more than two frequencies are used and a multifrequency focusing method is used. Both of these methods may be used with the present invention.

The apparatus and method of the present invention may also be used by replacing the galvanic sensors with propagation resistivity sensors. These are designed to operate in the MHz to GHz frequency range. Typically, two transmitters are symmetrically disposed about two receivers, and by measuring the amplitude and/or phase of a received signal at the two receivers for a propagating signal in the earth formation, the formation resistivity may be determined. A particular example of such an arrangement is disclosed in a copending United States Patent Application of Chemali et al, having the title "Electrical Imaging in Conductive and Non-Conductive Mud" filed on Jul. 8, 2003. The contents of the Chemali application are incorporated herein by reference. The device taught therein can be operated at 10 MHz to 2 Ghz.

Figure 12:
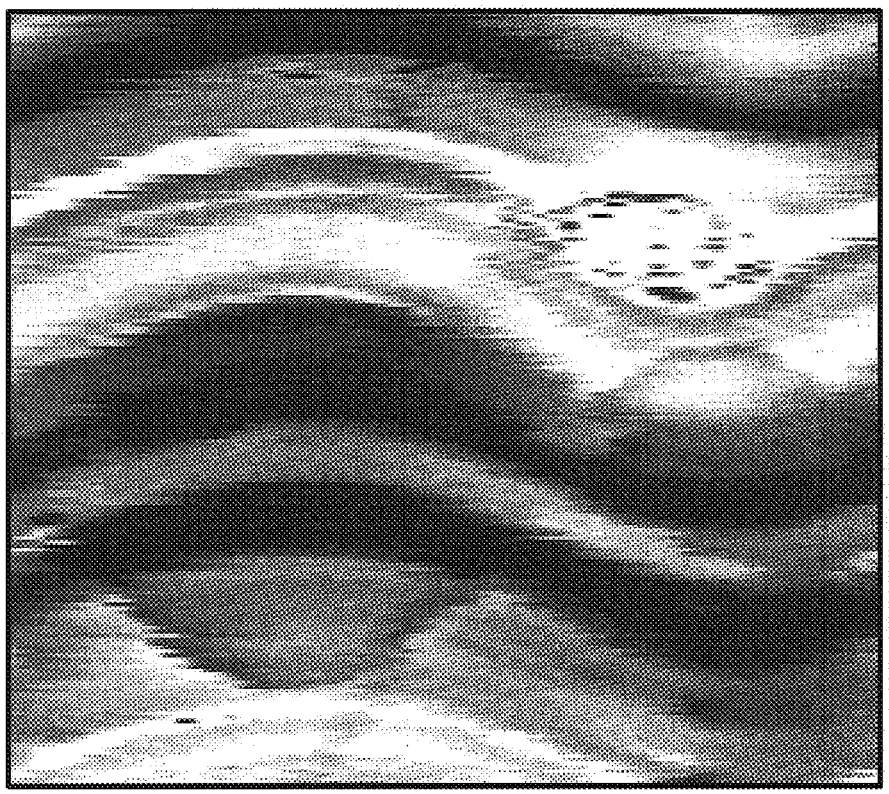
FIG. 12 (in color) shows the physical model obtained using the apparatus of the present invention in a model.

Turning now to FIG. 12, an example of a resistivity image produced by a galvanic resistivity sensor according to the method of the present invention. For laboratory measurements a borehole simulation tool was built up where measurements can be simulated.

Figure 13:
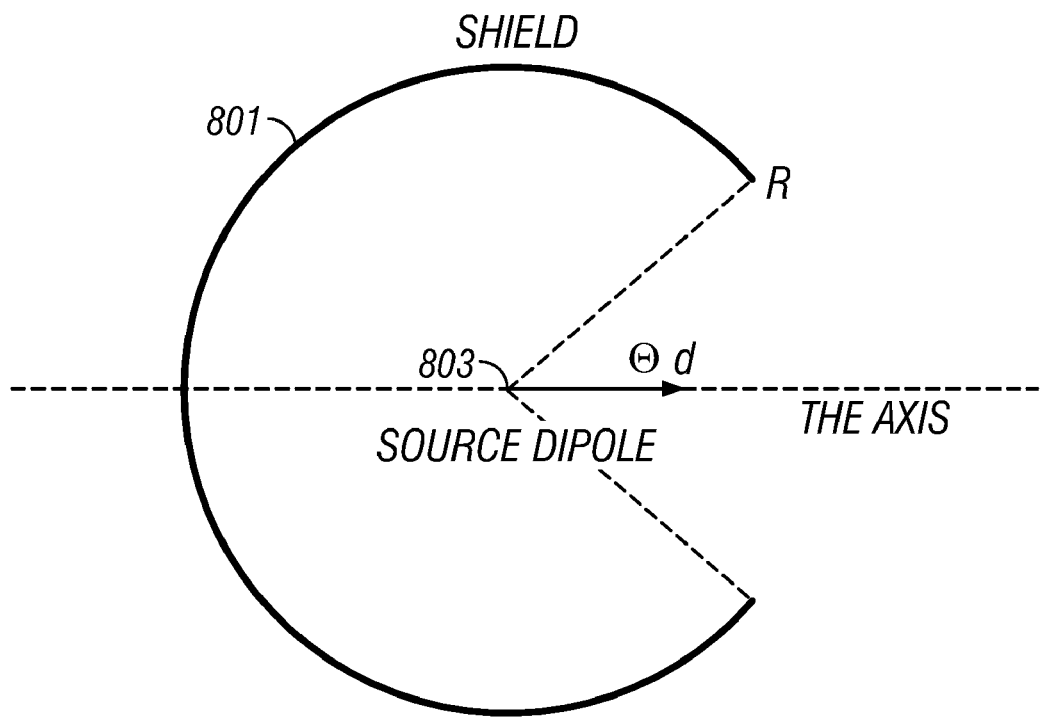
FIG. 13 shows an example of a shielded magnetic dipole suitable for use in an embodiment of the present invention.

In another embodiment of the invention a shielded dipole antenna is used. This is schematically illustrated in FIG. 13. The dipole antenna, depicted here by a point dipole 803 is surrounded by a shield 801. The axis of the dipole is directed radially away from the tool axis. Such a shielded antenna has stronger directional characteristics than an unshielded dipole antenna. Consequently, it is particularly suited for azimuthal imaging of borehole walls. The selection of angle θ has to be a compromise between directionality and the signal strength: the smaller the angle θ the greater the directionality (smaller aperture) but the less would be the signal strength. In a MWD device, the stacking over different rotations of the logging tool can be used to compensate for loss of the signal strength.

Figure 14:
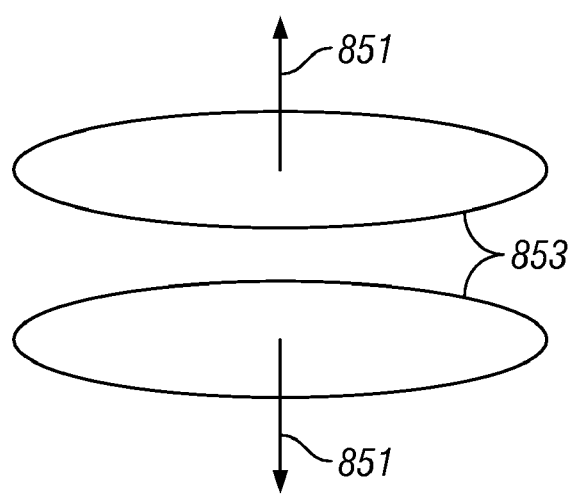
FIG. 14 shows an example of a quadrupole induction system suitable for use in an embodiment of the present invention.

In an alternate embodiment of the invention, a quadrupole antenna is used. This is schematically illustrated in FIG. 14. Shown by the arrows 851 are the preferred direction of a transmitter output while 853 depicts a radiation pattern. As can be seen, this has high directional sensitivity and can be used for azimuthal imaging. A particular feature of a quadrupole antenna is that when it is proximate to a bed boundary, it has directional sensitivity between up and down directions, whereas an unshielded dipole antenna may only be sensitive to presence of a bed boundary and cannot tell the difference between up and down directions, i.e., the position of the boundary relative to the tool.

In another embodiment of the invention, the resistivity sensor is a radar sensor of the type commonly referred to as ground penetrating radar (GPR). The operating frequency of such a radar may be in the range of 500 MHz to 10 GHz. This may be used to monitor the invasion of borehole mud, particularly OBM into earth formations. As discussed in Peeters et al, the reflection coefficient R at a plane interface between two media is given by $$R = \frac{\mu_2 k_1 - \mu_1 k_2}{\mu_2 k_1 + \mu_1 k_2}$$

where the μ's are the magnetic permeabilities of the two media and the k's are the wavenumbers. The wavenumber k is in turn related to the frequency ω, the relative magnetic permeability μ, the conductivity σ and the dielectric permittivity ε by the following equation:

$$k^2 = \omega^2 \mu \epsilon - i \omega \mu \sigma$$

A significant contrast in at least one of ε or σ will produce a noticeable radar reflection. The contrast in ε between oil and water is 81/5 for frequencies up to a few GHz. Similarly, there is a significant contrast in u between brine and fresh water.

Figure 15:
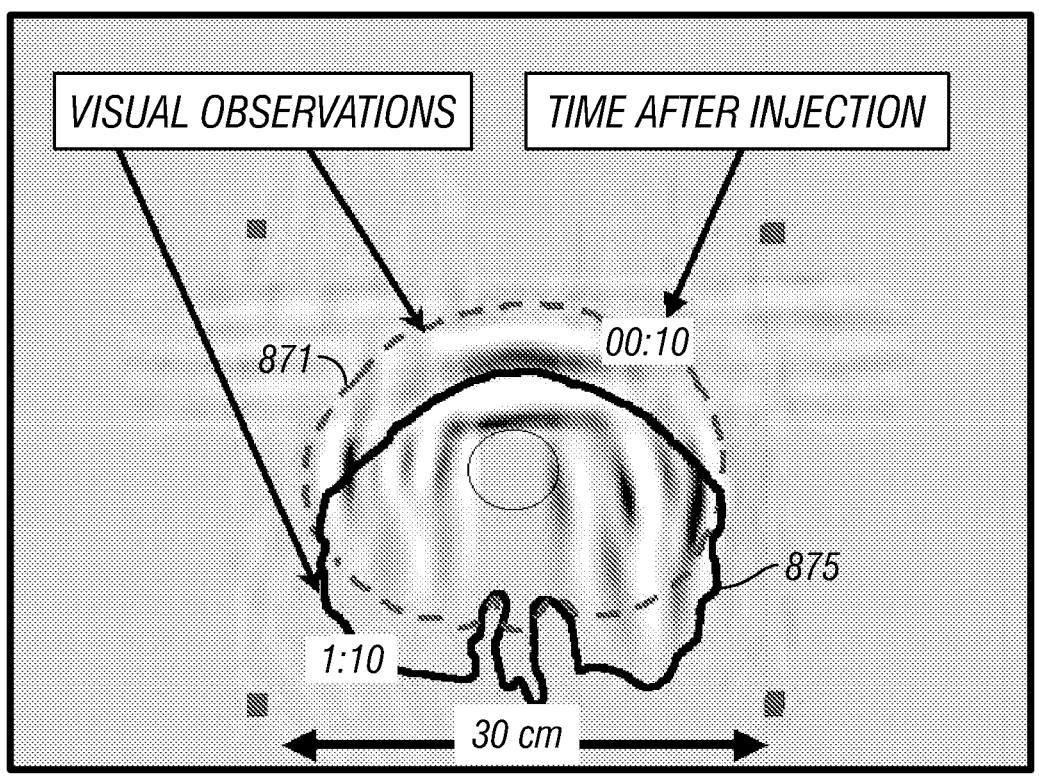
FIG. 15 (prior art) shows an example of ground penetrating radar measurements used for monitoring a fluid interface in a model study.

FIG. 15 shows prior art results from sandbox model studies using GPR. A GPR composite image is shown with visual observations of a fluid interface between two fluids superimposed. For the example shown, brine is invading a freshwater sandpack. The individual GPR images are processed images of data obtained using sources and receivers on the boundaries of the model. A conventional seismic migration algorithm was used for providing the images. The left side of the GPR image was acquired after 20 minutes and shows good agreement with the visual observations 871 after 10 minutes. The right side of the GPR image was obtained after 45 minutes and shows good correspondence with the visual observations 875 that were made after 1 hour and 10 minutes. The top radar panel was acquired in between and the results fall between the two visual fronts. This model study shows that GPR can produce a reflection from an brine/freshwater interface. The present invention uses GPR measurements made using sources and receivers in the wellbore (in contrast to the prior art data of FIG. 15 obtained using measurements on the boundaries of a sandbox model.) to monitor invasion of an OBM into a water saturated rock, or WBM into an oil bearing formation. Similarly, due to the contrast in σ, GPR can detect invasion of fresh water into a brine bearing rock.

Figure 16:
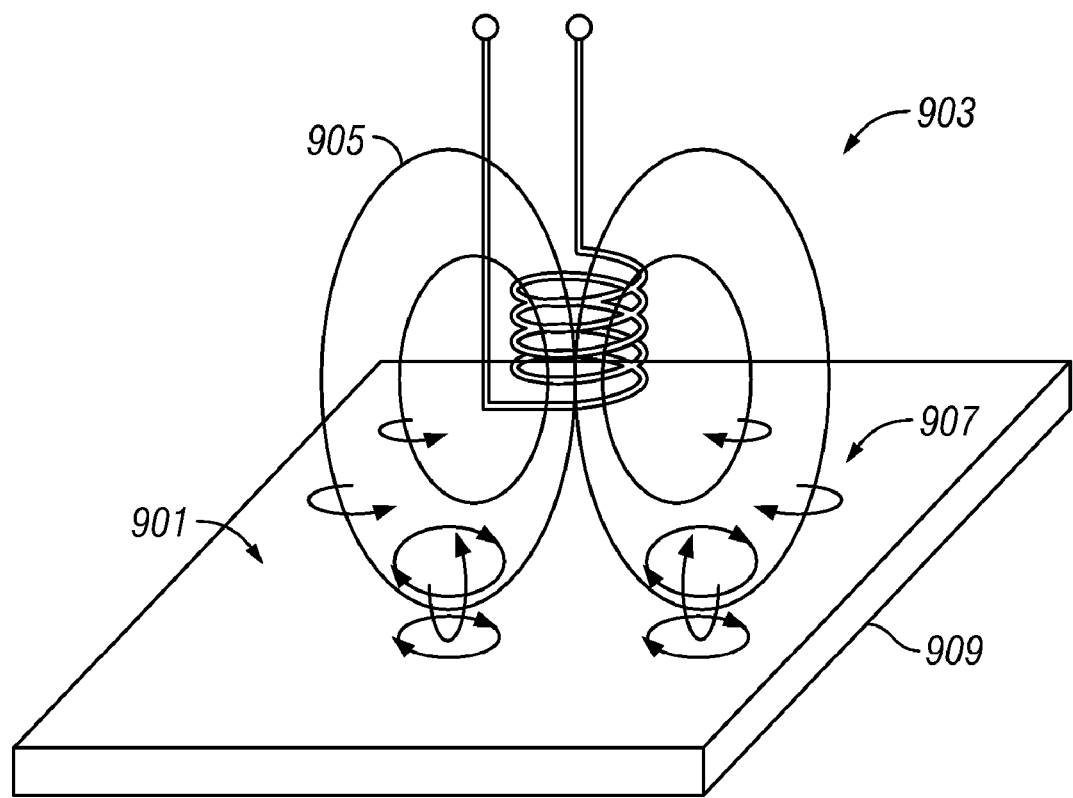
FIG. 16 (prior art) shows use of an induction coil as a resistivity sensor.

Another embodiment of the invention uses an induction coil as a resistivity sensor. In a conductive formation and OBM in the borehole, currents through the induction coil will induce eddy currents in the formation. By measuring changes in the resistance and inductive reactance of the coil, information can be gathered about the earth formation. This information includes the electrical conductivity and magnetic permeability of the material, the amount of material cutting through the coils magnetic field, and the condition of the material (i.e. whether it contains cracks or other defects.) The mutual inductance is affected by the standoff, and hence it is important to maintain the standoff at a selected value. This is illustrated in FIG. 16. Shown therein is a coil 905 in proximity to a conductive material such as an earth formation. The magnetic field lines from the coil are depicted by 903. The induced eddy currents are shown by 901 and the magnetic field resulting from the eddy currents are shown by 907. This basic principle has been used before for determining defects in casing.

The invention has been described above with reference to a device that is conveyed on a drilling tubular into the borehole, and measurements are made during drilling The processing of the data is preferably done downhole using a downhole processor at a suitable location. It is also possible to store at least a part of the data downhole in a suitable memory device, in a compressed form if necessary. Upon subsequent retrieval of the memory device during tripping of the drillstring, the data may then be retrieved from the memory device and processed uphole.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining a resistivity parameter of an earth formation during drilling of a borehole in said earth formation by a device on a bottom hole assembly (BHA), the method comprising:
   (a) maintaining a resistivity sensor on said BHA substantially at a specified offset from a wall of the borehole;
   (b) using said resistivity sensor for making measurements indicative of said parameter during continue rotation of said BHA by
      (i) using a current electrode of said resistivity sensor for conveying a measure current into the formation through a fluid,
      (ii) using at least one guard electrode proximate to the current electrode for maintaining focusing of the measure current, and
      (iii) using monitor electrodes to support the focusing in the presence of non negligible contact impedances;
   (c) using an orientation sensor on said BHA for making a measurement of a toolface angle of said BHA during said continued rotation; and (d) using a processor for estimating from said measurements made by the resistivity sensor and the orientation sensor a value of said parameter.

2. The method of claim 1 further comprising mounting said resistivity sensor on a pad.

3. The method of claim 1 further comprising mounting said resistivity sensor on a rib of said BHA.

4. The method of claim 1 further comprising mounting said resistivity sensor on a stabilizer of said BHA.

5. The method of claim 1 wherein said at least one guard electrode surrounds said measure electrode and maintains a focusing of said measure current in a flushed zone of said formation.

6. The method of claim 1 further comprising using said a least one guard electrode for creating substantially spherical equipotential surfaces.

7. The method of claim 1 further comprising:
using said processor for determining from a voltage of said measure electrode and said measure current said resistivity parameter.

8. The method of claim 1 further comprising a carrying said sensor on a pad that substantially circumscribes said apparatus.

9. The method of claim 1 further comprising using the processor for maintaining a substantially constant power consumption by said electrodes.

10. The method of claim 1 wherein said orientation sensor comprises a magnetometer.

11. The method of claim 1 wherein said orientation sensor comprises an accelerometer.

12. The method of claim 1 further comprising using a stabilizer for maintaining said specified offset.

13. The method of claim 1 further comprising using a steerable rib for maintaining said specified offset.

14. The method of claim 1 further comprising:
(i) using said BHA in a borehole is filled with a substantially nonconducting fluid, and
(ii) capacitively coupling said resistivity sensor to said earth formation.

15. The method of claim 14 further comprising using said resistivity sensor for making measurements at a plurality of different frequencies.

16. The method of claim 14 further comprising using said resistivity sensor for making measurements at two frequencies.

17. The method of claim 15 further comprising using said processor for performing a multi-frequency focusing of said measurements.

18. The method of claim 1 wherein said borehole includes a substantially non-conducting fluid therein.

19. A method of determining a resistivity parameter of an earth formation during drilling of a borehole, the method comprising:
maintaining a resistivity sensor comprising one of: a shielded dipole and a quadrupole on a bottomhole assembly (BHA) at a specified offset from a wall of the borehole;
using the resistivity sensor for making measurements indicative of the resistivity parameter during rotation of the BHA; and
using an orientation sensor on the BHA for making a measurement of a toolface angle of the BHA during the continued rotation; and
using a processor for estimating from the measurements the resistivity parameter.

20. The method of claim 19 wherein said resistivity sensor further comprises a radio frequency microwave transmitter.

21. The method of claim 19 further comprising using said processor for determining an extent of a fluid invasion of the earth formation.

22. The method of claim 1 wherein said orientation sensor comprises a magnetometer.

* * * * *

UNITED STATES PATENT AND TRADEMARK OFFICE
CERTIFICATE OF CORRECTION

| | | |
|---|---|---|
| PATENT NO. | : 7,576,543 B2 | Page 1 of 1 |
| APPLICATION NO. | : 11/748846 | |
| DATED | : August 18, 2009 | |
| INVENTOR(S) | : Rene N. Ritter et al. | |

It is certified that error appears in the above-identified patent and that said Letters Patent is hereby corrected as shown below:

Column 11, claim 6, line 14, delete "said a", insert --said at--.

Signed and Sealed this
Fifteenth Day of March, 2011

David J. Kappos
*Director of the United States Patent and Trademark Office*